United States Patent
Watson et al.

(10) Patent No.: US 6,919,059 B2
(45) Date of Patent: *Jul. 19, 2005

(54) PROCESS AND APPARATUS FOR RECOVERING SULPHUR FROM A GAS STREAM CONTAINING SULPHIDE

(75) Inventors: Richard William Watson, Near Ilkley (GB); Stephen Rhys Graville, Sheffield (GB)

(73) Assignee: The BOC Group plc, Windlesham (GB)

( * ) Notice: Subject to any disclaimer, the term of this patent is extended or adjusted under 35 U.S.C. 154(b) by 0 days.

This patent is subject to a terminal disclaimer.

(21) Appl. No.: 10/363,141

(22) PCT Filed: Sep. 4, 2001

(86) PCT No.: PCT/GB01/03966
§ 371 (c)(1),
(2), (4) Date: Jul. 3, 2003

(87) PCT Pub. No.: WO02/20139
PCT Pub. Date: Mar. 14, 2002

(65) Prior Publication Data
US 2004/0096381 A1 May 20, 2004

(30) Foreign Application Priority Data
Sep. 7, 2000 (GB) .............................. 0022012
Sep. 11, 2000 (GB) .............................. 0022230

(51) Int. Cl.[7] .......................... B01D 53/52; B01D 53/86; C01B 17/04
(52) U.S. Cl. ................. 423/224; 423/237; 423/244.09; 423/564; 423/574.1; 423/576.8
(58) Field of Search .................. 423/574.1, 574.2, 423/575, 576, 576.8, 224, 226, 237, 244.09, 564, 242.1

(56) References Cited

U.S. PATENT DOCUMENTS

| | | | | |
|---|---|---|---|---|
| 4,780,305 A | * | 10/1988 | Steppe | 423/574.1 |
| 5,139,765 A | * | 8/1992 | Szekely | 423/574.1 |
| 5,294,428 A | * | 3/1994 | Watson | 423/574.1 |
| 5,352,433 A | * | 10/1994 | Watson | 423/574.1 |
| 5,468,458 A | * | 11/1995 | Watson | 423/222 |
| 5,486,345 A | * | 1/1996 | Watson | 423/573.1 |
| 5,676,921 A | | 10/1997 | Heisel et al. | |
| 6,287,535 B1 | * | 9/2001 | Schendel | 423/573.1 |
| 2004/0022721 A1 | * | 2/2004 | Watson et al. | 423/574.1 |

FOREIGN PATENT DOCUMENTS

| | | |
|---|---|---|
| EP | 0 237 217 A | 9/1987 |
| EP | 0 565 316 A2 | 10/1993 |
| GB | 1 578 002 | * 10/1980 |
| WO | WO 00/10693 | 3/2000 |

* cited by examiner

Primary Examiner—Stanley S. Silverman
Assistant Examiner—Ardith E. Hertzog
(74) Attorney, Agent, or Firm—Philip H. Von Neida (57) ABSTRACT

Oxygen or oxygen-enriched air is employed to support combustion in furnaces (16) and (26) of part of the hydrogen sulphide content of a first feed gas stream. Sulphur vapour is extracted in condenser (32) from the resulting gas mixture so as to form a sulphur vapour depleted gas stream. The sulphur vapour depleted gas stream is passed into a catalytic reduction reactor (40) in which all the residual sulphur dioxide is reduced to hydrogen sulphide. This reduced gas mixture has water vapour extracted therefrom in a quench tower (52). The resulting water vapour depleted gas stream flows to a Claus plant for treatment typically together with a second feed gas steam comprising hydrogen sulphide. Employing both furnaces (16) and (26) makes it possible to obtain effective conversions to sulphur of the hydrogen sulphide in the feed gas without having the recycle any of the water vapour depleted gas.

7 Claims, 5 Drawing Sheets

PROCESS AND APPARATUS FOR RECOVERING SULPHUR FROM A GAS STREAM CONTAINING SULPHIDE

BACKGROUND OF THE INVENTION

This invention relates to a method of treating a feed gas stream comprising hydrogen sulphide.

Gas streams comprising hydrogen sulphide are formed for example as waste gases in an oil refinery or gas refinery operation. In view of their hydrogen sulphide content, these gas streams cannot be discharged to the atmosphere without first being treated so as to remove almost all the hydrogen sulphide.

A standard method of treating such a gas stream serves to recover sulphur therefrom is by the Claus Process. Conventional Claus processes are described in the introductory paragraphs of EP-A-565 316.

EP-A-565 316 discloses a process in which in a first reactor a part of the hydrogen sulphide content of a feed stream comprising hydrogen sulphide is oxidised to sulphur dioxide, and so formed sulphur dioxide is reacted with residual hydrogen sulphide to form sulphur vapour and water vapour. A partially reacted gas stream including sulphur vapour, water vapour, residual hydrogen sulphide and residual sulphur dioxide is withdrawn from the furnace. A sulphur condenser is employed to extract sulphur vapour from the partially treated gas stream so as to form a sulphur vapour depleted gas stream. At least part of the sulphur depleted gas stream is sent to a further reactor in which its sulphur dioxide content is reduced to hydrogen sulphide. Water vapour is extracted from the resulting reducer gas stream. The water vapour-depleted gas stream is then preferably recycled to the furnace. A purge stream is taken from a chosen position in the above described cycle and is subjected to further treatment so as to render it fit for discharge to the environment. The purpose of the recycle is to obtain a very high effective conversion of hydrogen sulphide to sulphur vapour in the furnace and thereby facilitate the attainment of a total conversion efficiency which is sufficient to meet any prevailing environmental standard.

By using pure oxygen (or air highly enriched in oxygen) the size of the initial furnace may be kept down. However, the advantages in size reduction of the initial purge gas made possible by the use of pure oxygen (or oxygen highly enriched in air) as the oxidant are counteracted by the recycle of gas to the furnace. Although EP-A-0 565 316 further discloses that the recycle can be omitted, this is stated not to be preferred as it has an adverse effect on the effective percentage conversion of hydrogen sulphide to sulphur in the furnace.

One solution to this problem suggested in EP-A-565 316 is to employ an amine separation unit to concentrate the recycle stream in hydrogen sulphide. Such amine separation units, however, tend to be particularly costly, even if only of a small size.

It is an aim of the method according to the invention to provide an alternative solution to this problem which does not necessitate a recycle.

SUMMARY OF THE INVENTION

According to the present invention there is provided a method of treating a feed gas stream comprising hydrogen sulphide, comprising the steps of:

(a) in at least two furnaces in series oxidising to sulphur dioxide a part of the hydrogen sulphide content of at least one feed stream comprising hydrogen sulphide and reacting thus formed sulphur dioxide with residual hydrogen sulphide to form sulphur vapour and water vapour;

(b) withdrawing from the downstream furnace a partially reacted gas stream including sulphur vapour, water vapour, residual hydrogen-sulphide and residual sulphur dioxide;

(c) extracting in a sulphur condenser, sulphur vapour from the partially treated gas stream so as to form a sulphur vapour depleted gas stream;

(d) catalytically reducing with hydrogen to hydrogen sulphide the sulphur dioxide and any sulphur vapour content of the sulphur vapour depleted gas stream so as to form a reduced gas stream (e) extracting water vapour by condensation from the reduced gas stream so as to form a water vapour depleted gas stream; and (f) feeding without cycle the water vapour depleted gas to at least one Claus plant for recovering sulphur from hydrogen sulphide comprising at least one further furnace for the oxidation of hydrogen sulphide to sulphur dioxide and reaction of resulting sulphur dioxide with residual hydrogen sulphide, a first further sulphur condenser, and a plurality of stages of catalytic reaction to form sulphur vapour, there being a second further sulphur condenser downstream of each stage of said catalytic reaction, and thereby extracting further sulphur vapour, wherein:

a gas containing at least 80% by volume of oxygen molecules is employed to support combustion in step (a); the water vapour depleted gas stream contains at least 40% by volume of hydrogen sulphide; and in step (f) the catalytic reaction is a Claus reaction between hydrogen sulphide and sulphur dioxide or a selective oxidation of hydrogen sulphide to sulphur, or both reactions.

The method according to the invention make it possible to achieve without recycle of the water vapour depleted gas, a high percentage conversion of hydrogen sulphide to sulphur upstream of the hydrogenation reactor while still obtaining a water vapour depleted gas stream sufficiently concentrated in hydrogen sulphide to enable it to be readily treatable in the Claus plant. Accordingly, if the Claus plant is an existing one, very high levels of uprating, typically at least 250%, and sometimes much higher can be achieved. A further advantage of the method according to the present invention is that it has such a heat balance that it can be a net exporter of high pressure, super heated, steam. This steam may be expanded in a turbo-expander which drives an electrical generator. Accordingly, electricity may be generated.

Preferably, from 80 to 90% of the hydrogen sulphide is converted to sulphur vapour upstream of the hydrogenation reaction in step (d) of the method according to the invention. This facilitates the achievement of a high uprating of the Claus plant.

It is preferred that the mole ratio of hydrogen sulphide to sulphur dioxide in the sulphur vapour depleted gas stream is in the range 4:1 to 10:1. This ratio may be achieved by appropriately limiting or controlling the rate of oxygen flow to the furnaces.

Preferably, the flow rate of oxygen to the upstream furnace is in the range of M to N where M=(0.8 a+b+0.16c) and N=(a+b+0.22c) where a is the stoichiometric rate of supply of oxygen for the complete oxidation to nitrogen and water vapour of any ammonia in the feed gas stream;

b is the stoichiometric rate of supply of oxygen for the complete combustion of any hydrocarbon(s) present in the feed gas stream; and c is the stoichiometric rate of oxygen supply required for the complete oxidation to sulphur dioxide and water vapour of hydrogen sulphide in the feed gas stream.

Conventionally, in Claus processes, oxygen for reaction of hydrogen sulphide is supplied at a rate approximately equal to 0.33c. By operating with substantially less oxygen the hydrogen sulphide to sulphur dioxide ratio in the first furnace is kept up thereby favouring the reduction of sulphur dioxide to sulphur vapour. Accordingly, very high levels of conversion of sulphur dioxide to sulphur can be achieved in the two furnaces in step (a) of the method according to the invention. Thus, any requirement for an external supply of hydrogen may be limited.

The rate of supply of oxygen to the second or downstream furnace in step (a) (when just two furnaces are employed in step (a)) is in the range P to Q, where P=0.8 d+e+0.16 f and Q=d+e+0.22f, wherein:

d is the stoichiometric rate of oxygen required for the total oxidation to nitrogen and water vapour of any ammonia entering the downstream furnace (preferably no ammonia enters the downstream furnace);

e the stoichiometric rate of oxygen supply required for the total combustion to carbon dioxide and water vapour of any hydrocarbons entering the downstream furnace (preferably no hydrocarbons enter the downstream furnace); and f is the stoichiometric rate of oxygen supply required for the complete combustion of hydrogen sulphide entering the downstream furnace to water vapour and sulphur dioxide.

Because the oxidation of hydrogen sulphide is strictly limited in the furnaces employed in step (a) of the method according to the invention, the amount of heat generated in each individual furnace is limited, thereby making unnecessary the introduction of special coolants or recycle streams into each furnace for the purposes of temperature limitation. Nonetheless, the effluent gas stream from the upstream furnace is preferably cooled, for example, in a waste heat boiler, upstream of the downstream furnace. This gas flow is preferably cooled to a temperature in the range of 300 to 500° C.

If desired, when two furnaces are employed in step (a) of the method according to the invention, sulphur vapour may be condensed between the upstream furnace and the downstream furnace. (If desired, the resulting gas stream may be reheated upstream of the downstream furnace to a temperature at which reaction between oxygen and hydrogen sulphide is autogenous.) Alternatively sulphur vapour can be allowed to pass from the upstream to the downstream furnace without there being intermediate sulphur condensation.

Sufficient hydrogen for the complete reduction to hydrogen sulphur and any residual sulphur vapour in the sulphur vapour depleted gas stream may sometimes be formed in situ by the thermal cracking of both hydrogen sulphide and ammonia during step (a) of method according to the invention. If desired, an external source of hydrogen can be provided to ensure that there is always an adequate amount of hydrogen available for reduction of the sulphur dioxide and any residual sulphur vapour.

Any known catalyst of the reaction between hydrogen and sulphur dioxide to form water vapour and hydrogen sulphide may be used in the catalytic hydrogenation stage.

The inlet temperature to the catalytic hydrogenator is preferably in the range of 200° C. to 400° C. The further sulphur depleted gas stream is preferably reheated intermediate the sulphur condensation step and the catalytic hydrogenation step.

If desired, the catalytic hydrogenation step may be performed with external cooling so as to limit the size of any temperature increase that takes place as a result of the exothermic reduction reaction. The external cooling is preferably formed by adding steam to the sulphur vapour depleted gas stream.

The water condensation step is preferably performed by direct contact of the reduced gas stream with water, the reduced gas stream being cooled by indirect heat exchange intermediate the catalytic reduction step and the water condensation step.

Preferably the resulting water vapour depleted gas leaves the water condensation step as a gas saturated in water vapour at a temperature in the range of 30° C. to 50° C. As a result, typically at least 85% of the water vapour present in the reduced gas stream is removed in the water condensation step.

A water vapour depleted gas stream containing at least 40% by volume of hydrogen sulphide is generally readily treatable in conventional Claus plants that use air to support combustion. When the hydrogen sulphide concentration is of the order of 40% by volume, some oxygen-enrichment of air used to support combustion in the further furnace or furnaces may be used, or some of the water vapour depleted gas may be by-passed to a downstream region of the further furnace or furnaces. Thus the Claus plant may be a conventional Claus plant, and hence the upstream integers (a) to (d) of the apparatus according to the invention may be retrofitted to a subsisting Claus plant so as to uprate it, typically by at least 250%. The feed to the said Claus plant may be supplemented with a second feed stream containing more than 40% by volume of hydrogen sulphide. Alternatively, or in addition, a gaseous oxidant containing at least 80% by volume of oxygen, preferably at least 90% by volume of oxygen, may be used to support combustion in the further furnace or furnaces. Otherwise, combustion may be supported by air unenriched in oxygen or oxygen-enriched air (or separate streams of air and oxygen or oxygen-enriched air) containing less than 80% by volume of oxygen.

Preferably two or three stages of catalytic reaction between hydrogen sulphide and sulphur dioxide are employed in the said Claus plant employed in step (f) of the method according to the invention depending on the overall conversion required.

Preferably, the said Claus plant additionally includes at its downstream end a so-called "tail gas clean up unit" which may typically include, in series, a water condenser, a unit for the reduction of sulphur dioxide to hydrogen sulphide, and a unit for absorption of hydrogen sulphide from the tail gas. The absorbent is preferably an amine which is selective for hydrogen sulphide.

If in the method according to the invention a plurality of Claus plants in parallel is employed, the Claus plants may share a common tail gas clean up plant.

The furnaces in step (a) of the method according to the invention are preferably operated at a pressure in the range of 1 to 2 bar absolute. The further furnace is preferably operated at a similar pressure. Preferably, in order to facilitate flow of the water vapour depleted gas stream into the further furnace, a flow of steam is employed so as to raise the pressure of the reduced gas stream. Preferably the steam is added to the reduced gas stream intermediate the hydrogenation and water extraction steps of the method according to the invention. Other positions are, however, possible for the addition of the steam. One or more eductors may be used for this purpose. Using such eductors makes it unnecessary to employ a fan or other rotary device for feeding the water vapour depleted gas stream into the plant or plants employed in step (e) of the method according to the invention. Further, the introduction of the steam upstream of the water vapour condensation step has the result that the total water vapour content of the water vapour depleted gas stream need not be increased and therefore has no detrimental effect of the operation of the downstream Claus plant or plants.

If desired, particularly if the hydrogen content of the water vapour depleted gas stream is greater than say, 10% by volume, the hydrogen may be separated from the water vapour depleted gas stream upstream of the Claus plant or plants.

The Claus plant preferably employs gaseous oxidant containing at least 80% by volume of oxygen molecules in the further furnace or further furnaces.

BRIEF DESCRIPTION OF THE DRAWINGS

The method according to the invention will now be described by way of example with reference to the accompanying drawings, in which.

The drawings are not to scale. Like parts in different Figures of the drawings are indicated by the same reference numerals.

DETAILED DESCRIPTION OF THE INVENTION

Figure 1:
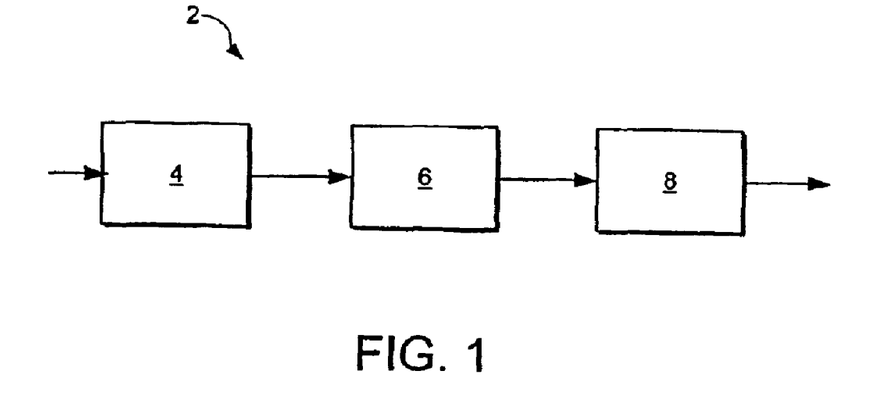
FIG. 1 is a generalised schematic flow diagram of a plant 2 for recovering sulphur from a gas stream containing hydrogen sulphide comprising a set 4 of retrofitted units; a main Claus plant 6, and a tail gas clean up unit 8.

Referring to FIG. 1 of the drawings, a sulphur recovery plant 2 comprises in sequence an upstream set of units 4 for performing steps (a) to (e) of the method according to the invention, a main Claus plant 6 for performing step (f) of the method according to the invention, and a tail gas clean-up plant 8 for cleaning the effluent gas from the Claus plant 6.

Figure 2:
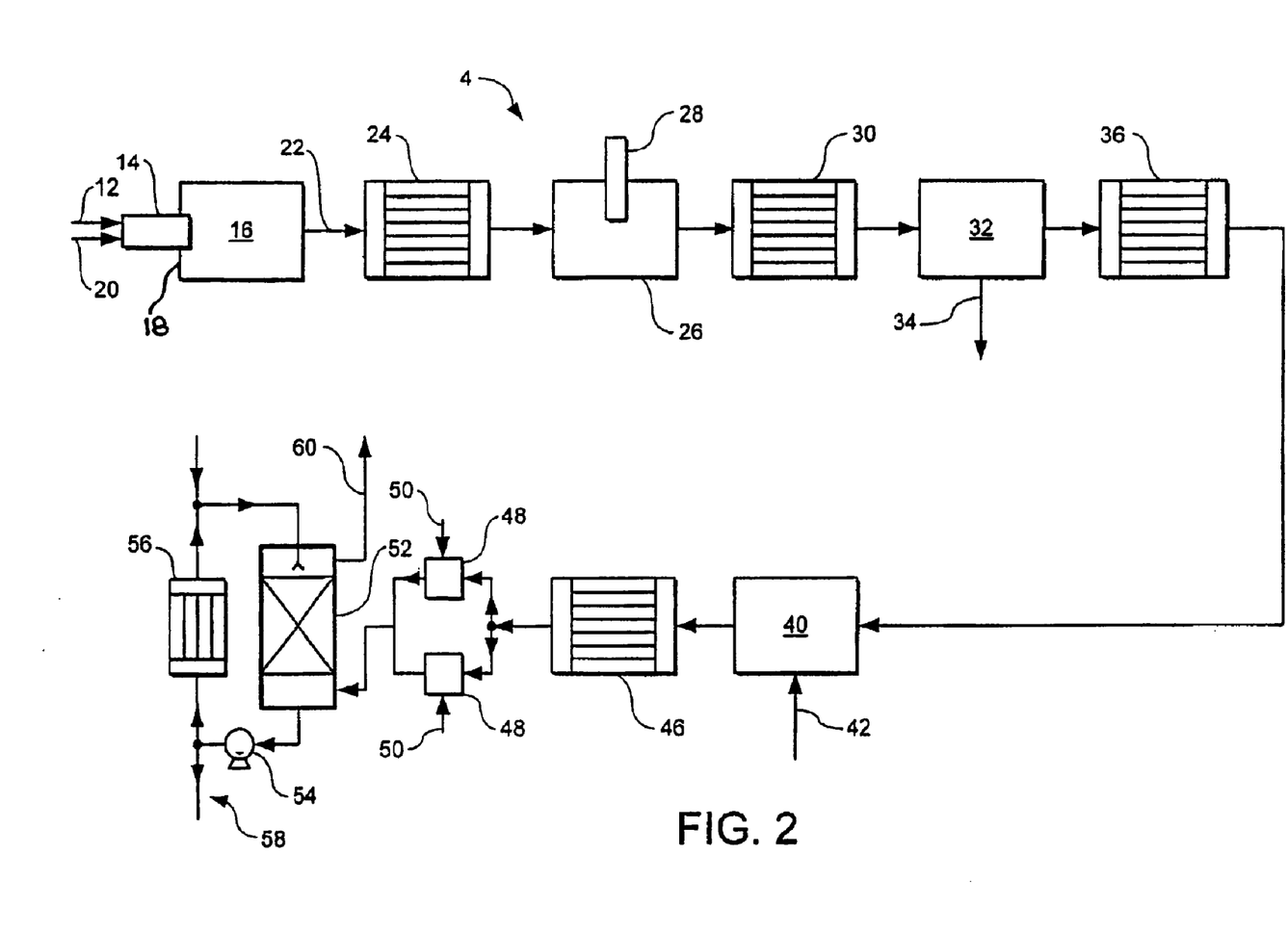
FIG. 2 is a schematic flow diagram illustrating a configuration of units 2 for use in the plant shown in FIG. 1.

Referring now to FIG. 2 of the drawings, a hydrogen sulphide containing feed gas stream typically comprising hydrogen sulphide, carbon dioxide and water vapour, and sometimes additionally including ammonia and/or one or more hydrocarbons is fed from a pipeline 12 to a burner 14 which either fires axially into a thermal reactor in the form of a refractory-lined furnace 16, through one end wall 18 thereof, or fires tangentially through a side wall at a position close to the end wall 18, typically at right angles to the axis of the furnace 16. The feed gas typically contains at least 70% by volume of combustibles. If the feed gas stream is a waste stream of an oil refinery it may be an acid gas (sometimes referred to as "amine gas"), or a mixture of amine gas with sour water stripper gas. The hydrogen sulphide containing feed gas stream is supplied to the burner 14 typically at a temperature in the range of 0° C. to 90° C., preferably 10° C. to 60° C., and is typically not preheated upstream of the furnace 16. The burner 14 is supplied separately from a pipeline 20 with a stream of commercially pure oxygen or a stream of air highly enriched in oxygen. In either case, the mole fraction of oxygen in the gas that is supplied along the pipeline 20 is at least 0.8. Indeed, the oxygen stream can typically contain at least 90% by volume of oxygen and may be separated from air by, for example, pressure swing adsorption or by fractional distillation, the latter separation method being able to produce oxygen at a purity in excess of 99%. A purity in excess of 99% is particularly preferred. By operation of the burner 14 a part of the hydrogen sulphide content of the first feed gas stream is burned in the furnace 16.

The rate of flow of oxygen or the oxygen content of an oxygen-enriched air along the pipeline 20 is in the range of M to N, where M=(0.8 a+b+0.16c) and N=(a+b+0.22c), and where a is the stoichiometric flow of oxygen required for the complete oxidation to nitrogen and water vapour of any ammonia present in the feed, b is the stoichiometric flow rate of oxygen required for the complete oxidation to carbon dioxide and water vapour of any hydrocarbons present in the feed, and c is the stoichiometric flow rate of oxygen required for the complete oxidation to water vapour and sulphur dioxide of the hydrogen sulphide content of the feed gas stream. In conventional terms, therefore the burner 14 operates with a relatively oxygen poor flame. Nonetheless, high flame temperatures, typically with a core temperature of over 2000° C., can be achieved without causing the outlet temperature of the furnace 16 to exceed 1600° C.

In addition to the abovementioned reactions, there is also thermal dissociation of a part of the hydrogen sulphide into hydrogen and sulphur vapour and some thermal dissociation of ammonia into hydrogen and nitrogen. Employing a combustion supporting gas rich in oxygen facilitates thermal dissociation (also known as thermal cracking) of hydrogen sulphide and ammonia particularly if high temperature zone (s) at a temperature of, over, say 2000° C. are created. Various other reactions may also take place in the furnace 16 such as the formation of carbon monoxide, carbon oxysulphide and carbon disulphide.

In operating the burner 14 and the furnace 16, care should of course be taken to avoid damage to the refractory lining. The angle and position of entry of the burner 14 into the furnace 16 and the flame configuration are chosen so as to avoid such damage. The thermal dissociation of hydrogen sulphide has a cooling effect which can be taken into account in selecting the position and angle of entry of the burner 14.

As a result of the reactions that take place in the furnace 16, an effluent gas stream typically comprising hydrogen sulphide, sulphur dioxide, water vapour, sulphur vapour, hydrogen, carbon dioxide, carbon monoxide, argon, nitrogen and traces of carbon oxysulphide leaves the furnace 16 through an outlet 22, typically at a temperature greater than 1000° C. (and preferably at a temperature greater than 1400° C.). At such temperatures, some of the components of the effluent gas stream are still reacting with one another so it is difficult to specify the precise composition of the gas mixture in the outlet 22. The gas stream passes from the outlet 22 directly into a waste heat boiler 24 or other form of heat exchanger in which it is cooled to a temperature typically in the range of 300° C. to 500° C. During the passage of the gas stream through the waste heat boiler 24, there is a tendency for some of the hydrogen to re-associate with sulphur vapour to form hydrogen sulphide. Cooled effluent gas stream flows from the waste heat boiler 24 into a further refractory lined furnace 26.

A lance 28 is employed to supply further pure oxygen (or, less preferably, oxygen-enriched air containing at least 80% by volume of oxygen) to the furnace 26. The same reactions take place as in the first furnace 16 with the exception of oxidation of ammonia and hydrocarbons because the gaseous feed to the furnace 26 is free of these components. The rate of supplying oxygen to the lance 28 is typically from 16 to 22% of the stoichiometric rate required for total combustion to sulphur dioxide and water vapour of the hydrogen sulphide present in the second furnace 26. The percentage conversion achieved in the second furnace 26 is less than that achieved in the first furnace 16 because the operating temperature tends to be lower and because the oxygen may also react with the hydrogen present in the gas entering the second stage 26.

The resulting gas exits the furnace 26 through another waste heat boiler 30 and flows to a sulphur condenser 32 in which sulphur is condensed at a temperature typically in the order of 130° C.

The condensed sulphur flows along a pipeline 34 to a sulphur pit (not shown) via a sulphur seal leg (not shown).

The sulphur vapour depleted gas stream leaving the sulphur condenser 32 is characterised by a high hydrogen sulphide to sulphur dioxide mole ratio, typically in the range 4:1 to 10:1.

The sulphur vapour depleted gas stream flows through a reheater 36 in which it is reheated from its condensation temperature (typically in the order of 130° C.) to a temperature in the order of 300° C. by indirect heat exchange with hot gas or direct heat exchange with a reducing gas generator (not shown).

The resultant heated gas stream passes to a catalytic reduction (hydrogenation) reactor 40 in which all the sulphur dioxide and residual traces of sulphur vapour are reduced by hydrogen to hydrogen sulphide over a suitable catalyst. The catalyst may, for example, include a mixed cobalt-molybdenum oxide. In addition to the reaction between sulphur dioxide and hydrogen to form hydrogen sulphide and water vapour and the reaction between hydrogen and any sulphur vapour to form hydrogen sulphide, other reactions can take place in the catalytic reduction reactor 40. In particular, any carbon monoxide present reacts with water vapour to form hydrogen and carbon dioxide. Further, at least 90% but not all of any carbon oxysulphide present in the reheated further sulphur vapour depleted gas stream is hydrolysed to carbon dioxide and hydrogen sulphide. Similarly, any carbon disulphide present is hydrolysed to carbon dioxide and hydrogen sulphide.

It is important to ensure that the reduction of sulphur dioxide and any residual sulphur goes to completion in the reactor 40. Otherwise there will be a tendency for sulphur to deposit in downstream parts of the plant. Sometimes, there is sufficient hydrogen present in the sulphur vapour depleted gas stream for the reduction reactions to go to completion. In any event, it is preferred to have available a pipeline 42 for the addition of external hydrogen in the event either of a temporary reduction of the hydrogen concentration in the gas mixture entering the reactor 40 to a level at which complete reduction of the sulphur dioxide might be jeopardised or if there is an inadequate hydrogen concentration in the sulphur vapour depleted gas stream. The external hydrogen may be generated on site by, for example, partial oxidation of hydrocarbon, preferably using pure oxygen or oxygen-enriched air as the oxidant, or, in conjunction with carbon monoxide, by a reducing gas generator using air, oxygen-enriched air, or pure oxygen as the oxidant.

If desired, the catalytic reduction reactor 40 may be provided with a cooling coil (not shown) in which a coolant, e.g. steam, may be passed in the event of there being an excessive generation of heat in the catalyst, or, alternatively, steam can be added directly.

The reduced gas stream, now consisting essentially of hydrogen sulphide, hydrogen, water vapour, carbon dioxide, nitrogen and argon, leaves the reactor 40 and flows through a heat exchanger 46 in which it is cooled to a temperature in the range of 100° C. to 200° C. (e.g. 150° C.) by indirect heat exchange of water and/or steam. The thus cooled gas stream flows through one or more eductors 48 in parallel with one another. In the eductors 48 the cooled, reduced, gas stream is mixed with superheated, pressurised steam supplied via a pipeline 50. Typically, the furnaces 16 and 26 are operated at a pressure in the range of 1.2 to 2 bar. The Claus plant 6 shown in FIG. 1 is operated at a similar pressure. The pressure of the reduced gas stream can be raised sufficiently by this addition of stream to ensure passage of all necessary gas to the Claus plant 6 by appropriate choice of the flow rate and supply pressure (and hence temperature) of the steam in the pipeline 50. Preferably, the steam is supplied at a pressure in the range of 10 to 50 bar and a corresponding temperature greater than 100° C. but less than 265° C.

The reduced gas stream, having been mixed with the steam is introduced into a desuperheating, direct contact, quench tower 52. In the quench tower 52, the gas stream flows upwardly and comes into contact with a descending stream of water. The reduced gas stream is thus cooled and most (preferably more than 85%) of its water vapour content is condensed, the condensate entering the descending liquid stream. The condensate includes the steam added to the reduced gas mixtures in the eductors 48. The quench tower 52 preferably contains a random or structured packing (not shown) so as to facilitate mass transfer between the ascending vapour and descending liquid. As a result, a water vapour-depleted gas stream is formed. The water exiting the bottom of the quench tower 52 is recirculated by means of a pump 54 and is cooled in a cooler 56 upstream of being reintroduced into the top of the quench tower 52. Excess water is removed through an outlet 58 and is sent to a sour water stripper (not shown) in order to remove its hydrogen sulphide content.

The resulting water vapour depleted gas stream, which passes out of the tower 52 through an outlet 60, typically contains in the order of at least 40% by volume of hydrogen sulphide and therefore makes a suitable feedstock for treatment in a conventional Claus plant.

Figure 5:
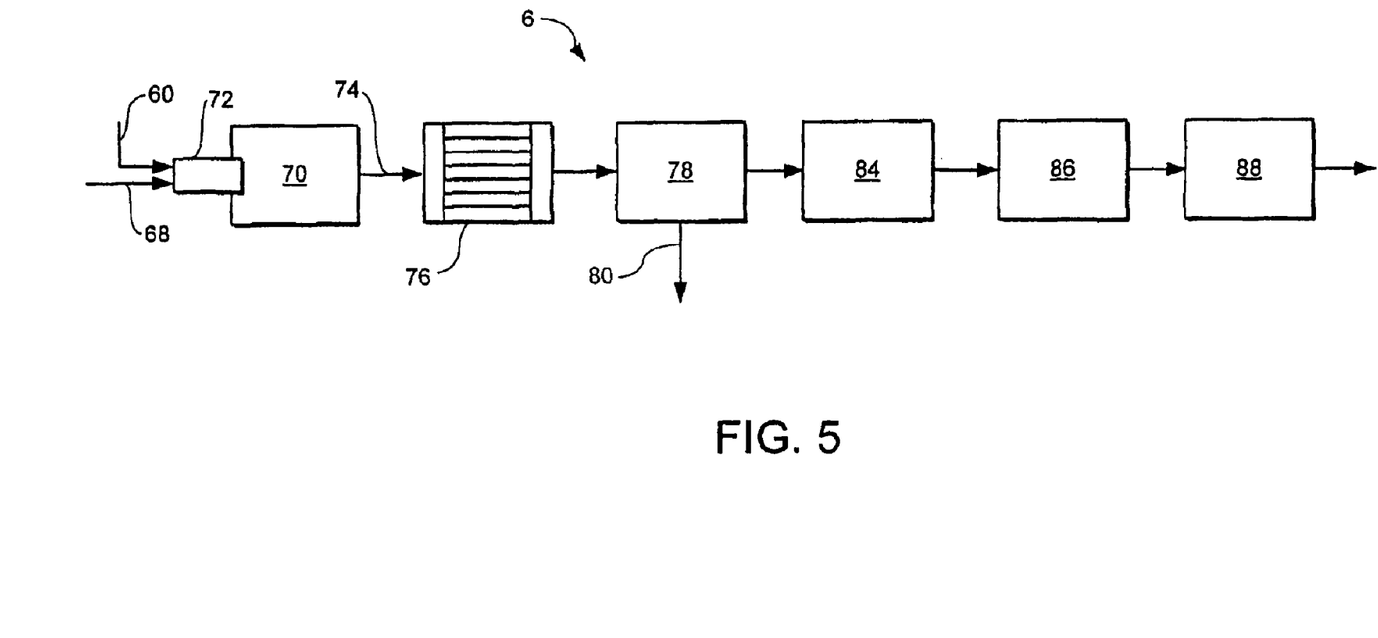
FIG. 5 is a schematic flow diagram of the main Claus plant 6 shown in FIG. 1.

The water vapour depleted gas streams leaves the top of the quench tower 52 typically at a temperature in the range of 30° C. to 50° C. and is sent to the Claus plant 6 shown in FIG. 5 of the accompanying drawings. Referring to FIG. 5, the water vapour depleted gas stream is received by a burner 72 firing into a further refractory-lined furnace 70. The burner 72 may also receive a second feed gas stream which may be of the same composition as or of a different composition from that of the feed gas stream to the furnace 16. For maximum uprating of the Claus plant 6, however, all the feed gas to it comes from the quench tower 52. The burner 72 additionally receives a stream of air, oxygen-enriched air or oxygen through a pipeline 68.

In an oil refinery, there are various different strategies for selecting the composition of the first and second feed gas streams. Generally in an oil refinery, there are one or more sources of amine gas, which typically contains more than 70% by volume of hydrogen sulphide but is free of ammonia, and one or more sources of sour water stripper gas, which typically contains approximately equal proportions of water vapour, hydrogen sulphide and ammonia. One strategy is simply to mix the amine gas with the sour water stripper gas to obtain the same composition for both the first feed gas stream and the second feed gas stream. One problem that sometimes arises in Claus plant in that of effecting complete destruction of ammonia. If the ammonia is not completely destroyed it can poison or react with downstream Claus catalysts. Particularly if air unenriched in oxygen is employed to support combustion in the further furnace 70, it is desirable that a greater proportion of the ammonia to be destroyed finds its way to the first feed gas stream rather than the second feed gas stream. This is because the relatively high oxygen mole fraction of the gas used to support combustion in the furnace 16 facilitates the creation of high flame temperatures which favour destruction of ammonia. Accordingly, it is often most preferred that all the sour water stripper gas is used in forming the first feed gas stream. Typically, some of the amine gas is mixed with the sour water gas or supplied separately therefrom to the burner 14 that fires into the furnace 16. Any remainder of the amine gas is typically sent to the burner 72 as the second feed gas stream.

The Claus plant shown in FIG. 5 may be in essence a conventional Claus plant which is operated in essentially a conventional manner. The reactions that take place in the furnace 70 are analogous to those that take place in the furnace 16 shown in FIG. 2 and need not be described further herein. A resulting gas stream having essentially the same components as the effluent gas stream from the furnace 16 shown in FIG. 2 leaves the furnace 70 through an outlet 74. (Typically, if a lower flame temperature is attained in the furnace 70 than in the furnace 16, the gas mixture leaving through the outlet 74 will contain a lower mole fraction of hydrogen than the corresponding gas leaving the furnace 16.) The effluent gas passes from the outlet 74 to a waste heat boiler 76 or other heat exchanger in which it is cooled by heat exchange with steam or other coolant. The resultant cooled gas stream typically leaves the waste heat boiler 76 at a temperature in the range of 250° C. to 400° C.

The cooled effluent gas stream passes from the waste heat boiler 76 to a further sulphur condenser 78 in which the effluent gas further cooled to a temperature in the range of 120° C. to 160° C. and in which the sulphur vapour is condensed and is extracted via an outlet 80. The resulting liquid sulphur is typically passed to a sulphur seal pit (not shown). One particularly important difference between the operation of the furnace 16, on the one hand, and of the furnace 70 on the other hand, is whereas at the outlet from the sulphur condenser 32 the mole ratio of hydrogen sulphide to sulphur dioxide in the sulphur depleted gas stream is at least 4:1, the corresponding ratio at the outlet from the condenser 78 is in the order of 2:1. The sulphur vapour depleted gas stream flows from the further sulphur condenser 78 through three successive catalytic Claus stages 84, 86 and 88. Each of the stages 84, 86 and 88, in accordance with the general practice in the art, comprises a train of units comprising, in sequence, a reheater (not shown) to raise the temperature of the gas mixture to a temperature suitable for catalytic reaction between hydrogen sulphide and sulphur dioxide (e.g. a temperature in the range of 200° C. to 350° C.), a catalytic reactor (not shown) in which hydrogen sulphide reacts with sulphur dioxide to form sulphur vapour and water vapour, and a yet further sulphur condenser (not shown).

Figure 6:
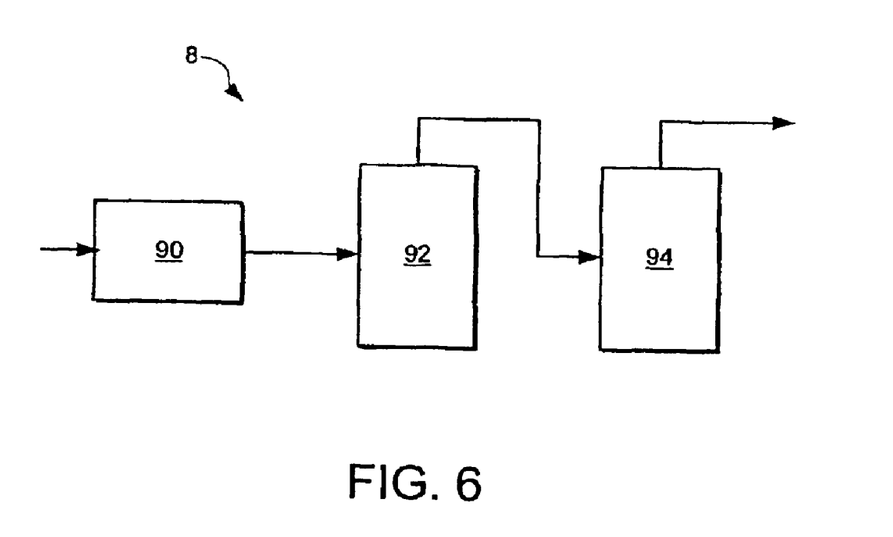
FIG. 6 is a schematic flow diagram of the tail gas clean up unit 8 shown in FIG. 1.

The gas mixture leaving the most downstream catalytic stage 88 may be subjected to any one of a number of known treatments for rendering Claus process effluent suitable for discharge to the atmosphere. For example, the gas mixture may flow to the tail gas clean up plant 8 shown in FIG. 6 of the accompanying drawings. With reference to FIG. 6, the gas mixture may pass to a reactor 90 in which the components present in the gas mixture are subjected to hydrolysis and hydrogenation. In the reactor 90, most of the residual carbon oxysulphide and carbon disulphide are hydrolysed over a catalyst, for example alumina impregnated with cobalt and molybdenum oxides to produce hydrogen sulphide and carbon dioxide. At the same time, residual elemental sulphur and sulphur dioxide are hydrogenated to hydrogen sulphide. The hydrolysis and hydrogenation typically take place at a temperature in the range of 300° C. to 350° C. A resulting gas mixture comprising of hydrogen sulphide, nitrogen, carbon dioxide, water vapour and hydrogen leaves the reactor 90 and flows first to a water condensation unit 92 and then to a separate unit 94 in which hydrogen sulphide is separated by means of absorption in a selective absorbent such as methyldiethylamine. If desired, the hydrogen sulphide may be recycled to, for example, the furnace 70.

The plant shown in FIG. 1 is able to achieve more than 99.5% and typically more than 99.7% conversion of hydrogen sulphide to sulphur. By retrofitting the units 4 shown in FIG. 2 to the Claus plant 6 shown in FIG. 5, its capacity may be more than doubled without any loss of conversion, or even with a gain in conversion In FIG. 3, there is shown a modification to the arrangement of units depicted in FIG. 2. There is located intermediate the waste heat boiler 24 and the second furnace 26, a sulphur condenser 300 and a reheater 302. The sulphur condenser 300 condenses sulphur at a temperature in the order of 135° C. This step helps to enhance conversion of hydrogen sulphide to sulphur vapour in the furnace 26 because the removal of the sulphur vapour has the effect of drawing forward the Claus reaction in the second furnace 26. The reheater 302 raises the temperature of the resulting sulphur-depleted gas stream to a temperature in the order of 500° C. such that autogenous combustion of hydrogen sulphide can take place in the furnace 300 and therefore the lance 28 can still be used to supply oxygen to the second furnace 26.

Figure 3:
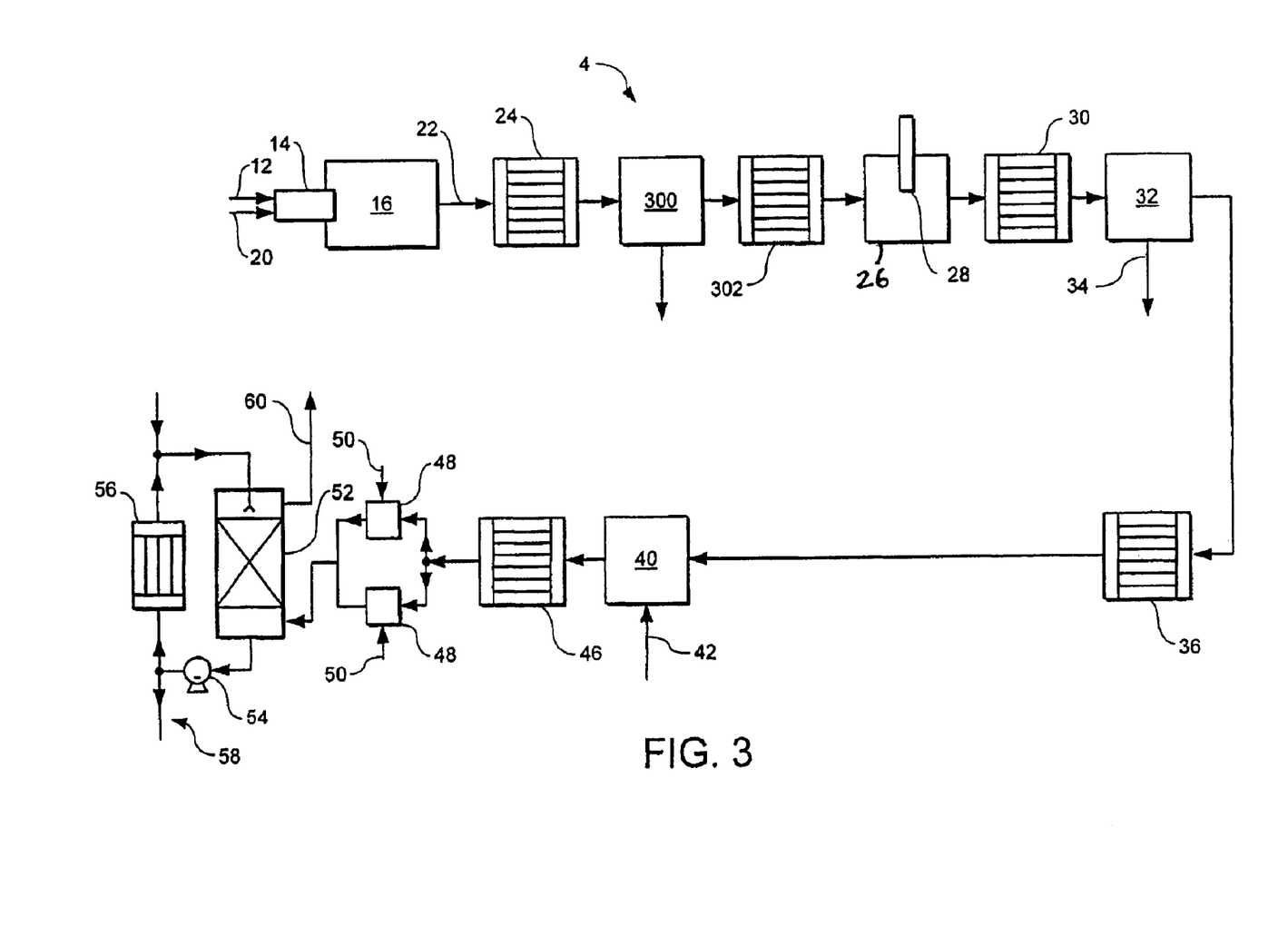
FIG. 3 is a schematic flow diagram illustrating a first alternative configuration of units 2 for use in the plant shown in FIG. 1.

In other respects, the arrangement and the operation of plant shown in FIG. 3 is essentially the same as that shown in FIG. 2.

Figure 4:
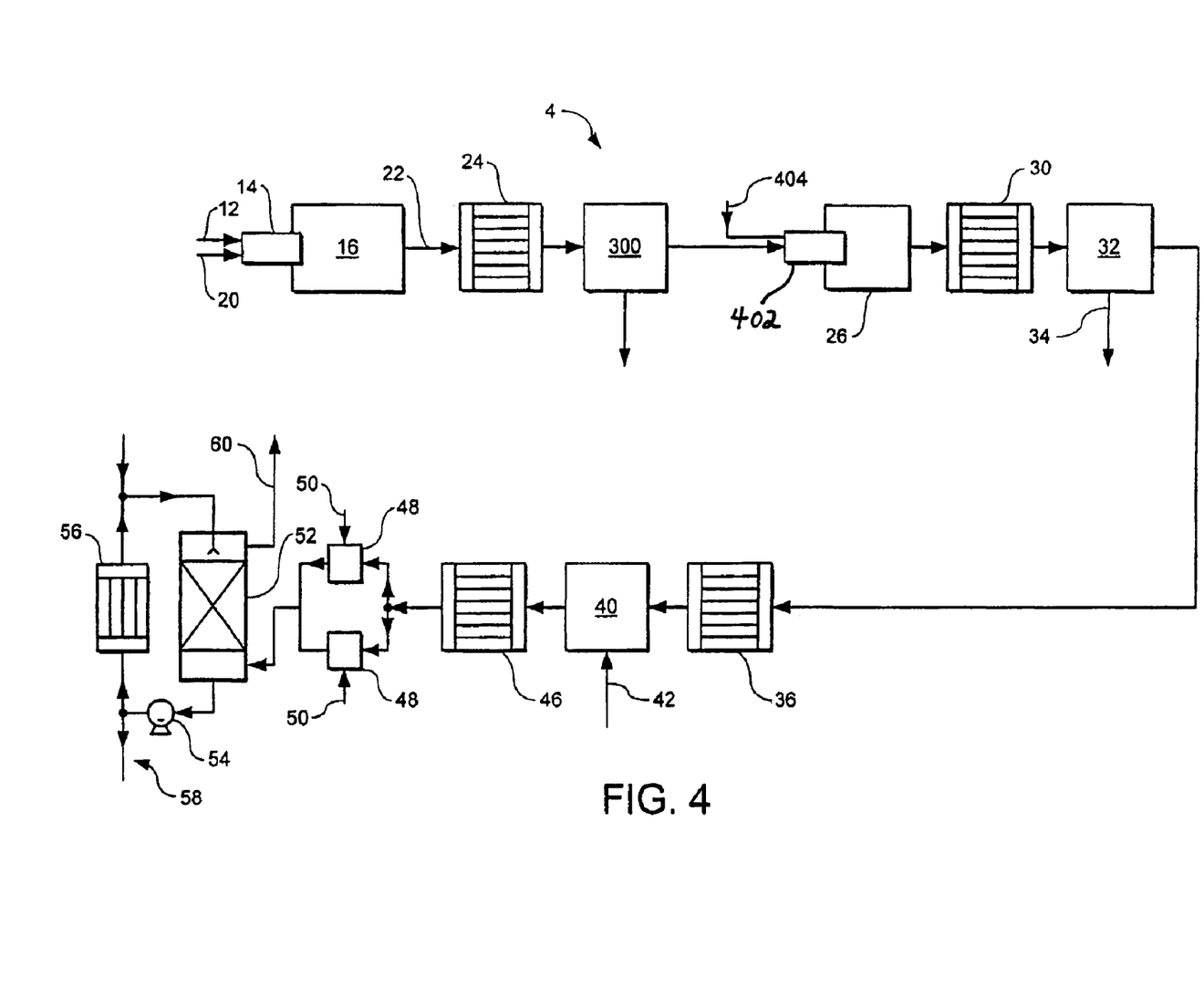
FIG. 4 is a schematic flow diagram illustrating a second alternative configuration of units 2 for use in the plant shown in FIG. 1.

The plant shown in FIG. 4 of the accompanying drawings and its operation are essentially the same as that shown in FIG. 3 with the exception that the reheater 302 is omitted. As a result a burner 402 with a separate oxygen inlet 404 is used instead of the lance 28. The burner 402 typically has its own ignition and flame detection systems.

Although, referring again to FIG. 1, the series of units 2 has been described as being retrofitted to the Claus plant 4 and the tail gas clean up plant 6, the entire plant may be assembled at the same time.

The method according to the present invention is now illustrated by the following examples:

Referring again to FIG. 1, a subsisting Claus plant 4 and associated tail gas clean up plant 6 treat a feed gas stream having the following composition.

71.78 mole % $H_2S$
14.44 mole % $H_2O$
11.11 mole % $NH_3$
2.00 mole % $CO_2$ 0.66 mole % $C_2H_8$ This feed gas stream is formed by mixing together amine gas with sour water stripper gas in the ratio of two parts by volume of the former to one part by volume of the latter.

The feed gas stream is supplied to the Claus plant 4 at a rate of 100 kmol/hr. This requires an air supply at a rate 202.73 kmol/hr. Accordingly, the furnace of the Claus plant has a volume sufficient to be able to receive a total of 302.73 kmol/hour.

Three computer simulations (using a SULSIM 5 program) were performed in order to evaluate uprating of the Claus plant by passing the feed gas into each of the following:

A) a set 2 of units as shown in FIG. 4 of the accompanying drawings;

B) a plant according to FIG. 4 of the drawings accompanying EP-A-565 316 (i.e. a plant similar to FIG. 2 of the accompanying drawings but omitting the furnace 26 and its associated waste heat boiler).

The simulations were performed assuming that the oxygen feed to the first furnace was 100% pure.

The results of the simulations are shown in Table 1 below, in which all flow rates are in kmol/hr. Based on previous practical experience of the operation of oxygen-enhanced Claus furnaces, it is believed that the program underestimates the percentage conversion achieved in such furnaces. As a result the requirement for external hydrogen in the catalytic hydrogenator may be overestimated. The results set out in Table 1 should therefore be taken as being confirmative of the operability of the examples of the method according to the invention rather than giving accurate operating data.

TABLE 1

|  | A | B |
|---|---|---|
| Feed flow rate | 100 | 100 |
| Oxygen Flow rate to first furnace or (Case A only) to upstream combustion stage of the first furnace | 30 | 32 |
| Exit temperature from first furnace or (Case A only) from upstream combustion stage of the first furnace | 1508° C. | 1578° C. |
| Oxygen flow rate to downstream combustion stage of the first furnace (Case A only) | 10 | — |
| Exit temperature from downstream combustion stage of the first furnace (Case A only) | 1041° C. | — |
| $H_2S$ to $SO_2$ mole ratio at inlet to catalytic hydrogenator | 4.47:1 | 4.2:1 |
| External hydrogen supply rate to catalytic hydrogenator | 5 | 2 |
| Total conversion ($H_2S$ to S) | 75.2% | 57.5% |
| $H_2S$ in exit gas | 62.6 mole % | 72.5 mole % |
| Exit flow rate | 28.4 | 41.9 |

These results show that the example of the method according to the invention is able to achieve lower exit gas flow rates than the example of the method according to EP-A-565 316, thereby making possible a greater degree of uprating.

Based on the above results, the maximum feed rates of the acid gas to the retro-fitted units 2 was calculated. The results of the calculations are set out below:

| A | 460 kmol/hr |
|---|---|
| B | 275 kmol/hr |

Thus, the method A according to the invention makes possible more than a fourfold uprating of the Claus plant 4.

Even greater upratings are made possible if the Claus plant 4 is converted to operate in accordance with EP-A-0 237 217 in which its single combustion furnace is replaced with two combustion furnaces in series, in both of which oxygen is employed to support combustion. Now the maximum feed rates of acid gas become

| A | 810 kmol/hr |
|---|---|
| B | 600 kmol/hr |

Various changes and modifications to the plant show in the drawings may be made. For example, a considerable simplification of the plant 4 shown in FIG. 2, may be achieved by employing a plurality of passes in the waste heat boiler 24. As a result the gas from the first pass can enter into a chamber which acts as the furnace 26. The hot gas from the furnace 26 flows through the second pass of the waste heat boiler 24 and downstream thereof proceeds directly to the sulphur condenser 32. As a result, the waste heat boiler 30 can be omitted altogether.

In another modification, the eductor or eductors 48 can be omitted and the furnace 70 in the Claus plant 6 operated at a sufficiently lower pressure than the furnaces 16 and 26 to obviate the need for a fan instead. A lower operating pressure can be created by reducing the total gas flow to the furnace 70 on retrofitting the units 4. This is particularly easy to do if the furnace 70 was before the retro-fit operated with air as an oxidant. If oxygen is substituted for at least some of the air, the flow rate of oxidant may be reduced by an amount necessary to give the desired lower operating pressure.

In a yet further modification, the eductor or eductors 48 can be omitted from the arrangements shown in FIGS. 2 to 4 and redeployed intermediate the reactor 90 and the condenser 92 in the tail gas clean up plant shown in FIG. 6.

Finally, a catalytic; selective oxidation stage in which hydrogen sulphide is selectively reacted with oxygen to form sulphur vapour and water vapour over a selective oxidation catalyst can be substituted for or added to any of the catalytic Claus stages in the method and apparatus according to the present invention, particularly the most downstream catalytic Claus stage in the plant 6 shown in FIG. 5 of the accompanying drawings. Selective oxidation catalysts are well known in the art. Such a selective oxidation stage may be particularly useful as the final catalytic stage in the plant 6 if the tail gas clean up unit 8 is omitted from the arrangement shown in FIG. 1 because it helps to enhance the conversion of hydrogen sulphide to sulphur.

Having thus described the invention, what we claim is:

1. A method of treating a feed gas stream comprising hydrogen sulphide, comprising the steps of:
    a) in at least two furnaces in series oxidising to sulphur dioxide a part of the hydrogen sulphide content of at least one feed gas stream comprising hydrogen sulphide and reacting thus formed sulphur dioxide with residual hydrogen sulphide to form sulphur vapour and water vapour;
    b) withdrawing from the downstream furnace a partially reacted gas stream including sulphur vapour, water vapour, residual hydrogen sulphide and residual sulphur dioxide;

c) extracting in a sulphur condenser, sulphur vapour from the partially reacted gas stream so as to form a sulphur vapour depleted gas stream;

d) catalytically reducing with hydrogen to hydrogen sulphide the sulphur dioxide and any sulphur vapour content of the sulphur vapour depleted gas stream so as to form a reduced gas stream;

e) extracting water vapour by condensation from the reduced gas stream so as to form a water vapour depleted gas stream; and f) feeding without recycle the water vapour depleted gas stream to at least one Claus plant for recovering sulphur from hydrogen sulphide comprising at least one further furnace for the oxidation of hydrogen sulphide to sulphur dioxide and reaction of resulting sulphur dioxide with residual hydrogen sulphide, a first further sulphur condenser, and a plurality of stages of catalytic reaction, there being a second further sulphur condenser downstream of each stage of said catalytic reaction, and thereby extracting further sulphur vapour wherein:

a gas containing at least 80% by volume of oxygen molecules is employed to support combustion in step a), the water vapour depleted gas stream contains at least 40% by volume of hydrogen sulphide, and in step f) the catalytic reaction is a Claus reaction between hydrogen sulphide and sulphur dioxide or a selective oxidation of hydrogen sulphide to sulphur, or both reactions.

2. A method according to claim 1, wherein in step f) each stage of catalytic reaction is a Claus reaction between hydrogen sulphide and sulphur dioxide.

3. A method according to claim 1, in which the mole ratio of hydrogen sulphide to sulphur vapour in the sulphur vapour depleted gas stream is in the range of 4:1 to 10:1.

4. A method according to claim 1, wherein the flow rate of oxygen to the upstream furnace in step a) is in the range of M to N where $M=(0.8\ a+b+0.16c)$ and $N=(a+b+0.22c)$ where:

a) is the stoichiometric rate of supply of oxygen for the complete oxidation to nitrogen and water vapour of any ammonia in the feed gas stream;

b) is the stoichiometric rate of supply of oxygen for the complete combustion of any hydrocarbon(s) present in the feed gas stream; and c) is the stoichiometric rate of oxygen supply required for the complete oxidation to sulphur dioxide and water vapour of hydrogen sulphide in the feed gas stream.

5. A method according to claim 1 wherein two furnaces are used, wherein the rate of supply of oxygen to the downstream furnace in step a) is in the range P to Q. where $P=0.8\ d+e+0.16f$ and $Q=d+e+0.22f$, where:

d) is the stoichiometric rate of oxygen required for the total oxidation to nitrogen and water vapour of any ammonia entering the downstream furnace;

e) is the rate of oxygen supply required for the total combustion to carbon dioxide and water vapour of any hydrocarbons entering the downstream furnace and f) is the stoichiometric rate of oxygen supply required for the complete combustion of hydrogen sulphide entering the downstream furnace to water vapour and sulphur dioxide.

6. A method according to claim 1, wherein the water condensation step e) is performed by direct contact of the reduced gas stream with water, the reduced gas stream being cooled by indirect heat exchange intermediate the catalytic reduction step d) and the water condensation step e).

7. A method according to claim 1, wherein from 80 to 90% of the hydrogen sulphide entering step a) is converted to sulphur vapour upstream of the catalytic reduction step d).

* * * * *